US009605882B2

(12) United States Patent
Hancock

(10) Patent No.: US 9,605,882 B2
(45) Date of Patent: Mar. 28, 2017

(54) HEAT PUMP WITH EXHAUST HEAT RECLAIM

(71) Applicant: Trane International Inc., Piscataway, NJ (US)

(72) Inventor: Stephen Stewart Hancock, Flint, TX (US)

(73) Assignee: Trane International Inc., Piscataway, NJ (US)

( * ) Notice: Subject to any disclaimer, the term of this patent is extended or adjusted under 35 U.S.C. 154(b) by 240 days.

(21) Appl. No.: 14/555,236

(22) Filed: Nov. 26, 2014

(65) Prior Publication Data

US 2015/0159928 A1 Jun. 11, 2015

Related U.S. Application Data

(60) Provisional application No. 61/914,872, filed on Dec. 11, 2013.

(51) Int. Cl.
  *F25B 7/00* (2006.01)
  *F25B 27/02* (2006.01)
  *F25B 49/02* (2006.01)
  *F25B 13/00* (2006.01)

(52) U.S. Cl.
  CPC .............. *F25B 27/02* (2013.01); *F25B 49/02* (2013.01); *F25B 13/00* (2013.01); *F25B 2313/004* (2013.01); *F25B 2313/029* (2013.01); *F25B 2313/0294* (2013.01); *F25B 2313/02543* (2013.01); *F25B 2313/0312* (2013.01); *F25B 2313/0314* (2013.01); *F25B 2327/001* (2013.01); *F25B 2341/0662* (2013.01); *F25B 2500/09* (2013.01); *F25B 2500/19* (2013.01); *F25B 2600/024* (2013.01); *F25B 2600/0261* (2013.01); *F25B 2600/2507* (2013.01); *F25B 2600/2513* (2013.01); *F25B 2700/2103* (2013.01)

(58) Field of Classification Search
  CPC .......... F25B 7/00; F25B 27/00; F25B 29/003; Y02B 30/62
  USPC .. 62/79, 94, 176.4, 238.1, 238.4, 228.4, 115
  See application file for complete search history.

(56) References Cited

U.S. PATENT DOCUMENTS

| | | |
|---|---|---|
| 3,896,992 A | 7/1975 | Borovina et al. |
| 4,141,490 A | 2/1979 | Franchina |
| 4,241,588 A | 12/1980 | Murphy et al. |
| 4,287,723 A | 9/1981 | Dosmond |
| 4,371,111 A | 2/1983 | Pernosky |
| 4,401,261 A | 8/1983 | Brown |
| 4,412,526 A | 11/1983 | DeGrose |

(Continued)

*Primary Examiner* — Melvin Jones
(74) *Attorney, Agent, or Firm* — Conley Rose, P.C.; J. Robert Brown, Jr.; Michael J. Schofield

(57) ABSTRACT

An exhaust heat reclaim system may include a diverter valve selectively connected in fluid communication to an exhaust vent tube and an exhaust delivery tube and configured to selectively divert hot exhaust fluid discharged from an exhaust of a power generation device to at least one of the exhaust vent tube and the exhaust delivery tube. The exhaust heat reclaim system may be a component of an HVAC system and be configured to discharge hot exhaust fluid onto a heat exchanger of the HVAC system, where the heat exchanger may be configured to promote heat transfer between the hot exhaust fluid and a refrigerant flowing through the heat exchanger of the HVAC system.

19 Claims, 4 Drawing Sheets

(56) References Cited

U.S. PATENT DOCUMENTS

| | | |
|---|---|---|
| 4,416,121 A | 11/1983 | Sjostedt et al. |
| 4,660,761 A | 4/1987 | Bussjager |
| 4,955,205 A * | 9/1990 | Wilkinson ............ F24F 3/1417 62/176.4 |
| 5,983,890 A | 11/1999 | Thomas et al. |
| 6,250,916 B1 | 6/2001 | Philippe et al. |
| 6,484,799 B1 | 11/2002 | Irish |
| 7,155,927 B2 | 1/2007 | Sawada et al. |
| 2012/0318009 A1 * | 12/2012 | Duesel, Jr. ........... B01D 1/0058 62/121 |

* cited by examiner

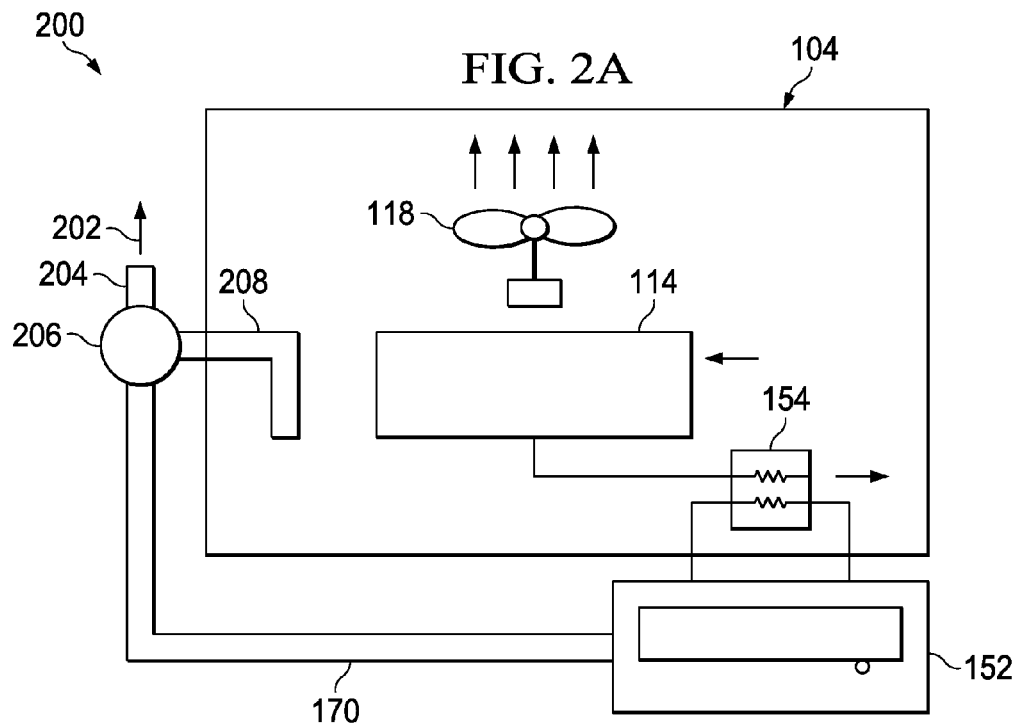
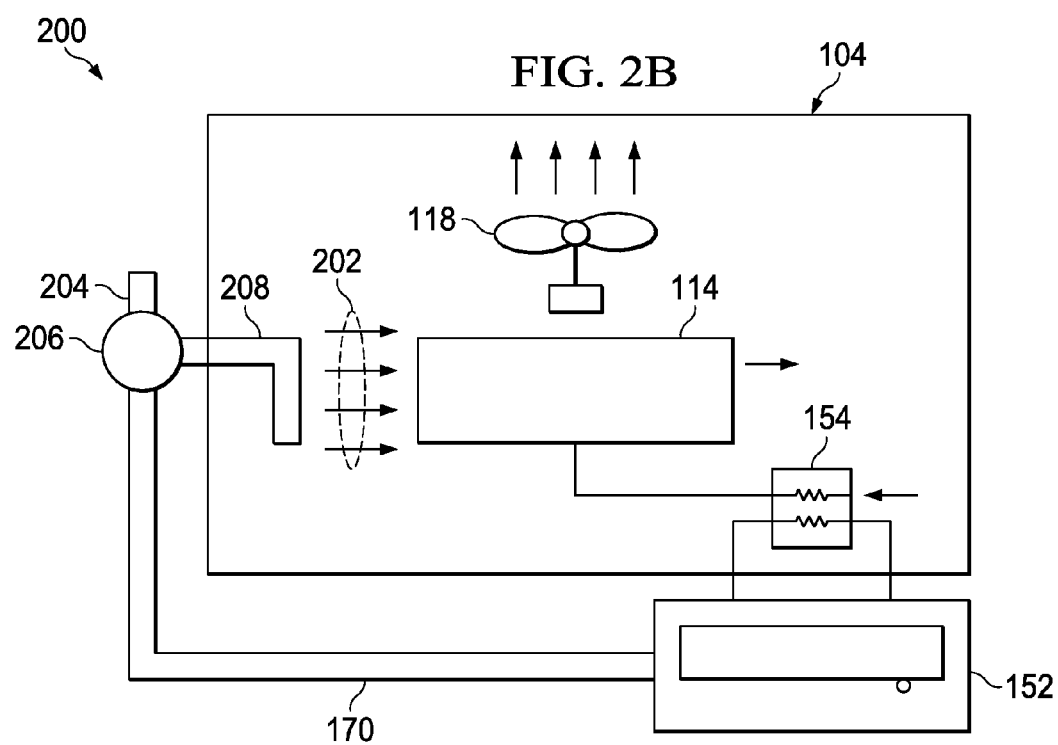

HEAT PUMP WITH EXHAUST HEAT RECLAIM

CROSS-REFERENCE TO RELATED APPLICATIONS

The present application claims priority under 35 U.S.C. §119(e) to U.S. Provisional Patent Application No. 61/914,872 filed on Dec. 11, 2013 by Hancock, entitled "Heat Pump with Exhaust Heat Reclaim," the disclosure of which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Heating, ventilation, and/or air conditioning (HVAC) systems may generally be used in residential and/or commercial areas for heating and/or cooling to create comfortable temperatures inside those areas. Some HVAC systems may be heat pump systems. Heat pump systems may generally be capable of cooling a comfort zone by operating in a cooling mode for transferring heat from a comfort zone to an ambient zone using a refrigeration cycle and also generally capable of reversing the direction of refrigerant flow through the components of the HVAC system so that heat is transferred from the ambient zone to the comfort zone, thereby heating the comfort zone. Some heat pump systems may be combined heat and power heat pump (CHPHP) systems that may comprise an internal combustion engine powered electricity generator for powering at least a portion of the CHPHP.

SUMMARY

In some embodiments of the disclosure, a heating, ventilation, and/or air conditioning (HVAC) system is disclosed as comprising: a generator comprising an internal combustion engine, the generator being configured to provide exhaust fluid to an exhaust of the generator; a heat exchanger configured to receive a refrigerant; and an exhaust delivery tube connected to the exhaust and configured to deliver received exhaust fluid into contact with the heat exchanger.

In other embodiments of the disclosure, a method of operating a heating, ventilation, and/or air conditioning (HVAC) system is disclosed as comprising: providing a generator comprising an internal combustion engine; producing exhaust fluid as a result of operating the internal combustion engine; and transferring heat of the exhaust fluid to a refrigerant of the HVAC system.

BRIEF DESCRIPTION OF THE DRAWINGS

For a more complete understanding of the present disclosure and the advantages thereof, reference is now made to the following brief description, taken in connection with the accompanying drawings and detailed description:

FIG. 2A is a schematic drawing of an exhaust heat reclaim system configured in a venting mode according to an embodiment of the disclosure;

FIG. 2B is a schematic drawing of an exhaust heat reclaim system configured in a heat reclaim mode according to an embodiment of the disclosure;

DETAILED DESCRIPTION

In some cases, it may be desirable to provide an exhaust heat reclaim system in an HVAC system, such as a combined heat and power heat pump (CHPHP) system. For example, where excess heat that may be reclaimed is discharged into the surrounding environment as hot exhaust fluid and/or where the efficiency of a heat pump system may be increased by reclaiming such excess heat energy from the hot exhaust fluid, it may be desirable to provide an exhaust heat reclaim system to reclaim such heat energy from the exhaust to boost heat pump system performance that would otherwise be discharged into the surrounding environment and lost. In some embodiments, systems and methods are disclosed that comprise providing an exhaust heat reclaim system comprising an exhaust vent tube, an exhaust delivery tube, and a diverter valve connected in fluid communication to the exhaust vent tube and the exhaust delivery tube and configured to selectively divert hot exhaust fluid from the generator to at least one of the exhaust vent tube and the exhaust delivery tube, wherein hot exhaust diverted through the exhaust delivery tube is discharged onto a heat exchanger that is configured to promote heat transfer between the hot exhaust fluid and refrigerant flowing through the heat exchanger. In some embodiments, the exhaust heat reclaim system may be used in a heat pump system. In some embodiments, the exhaust heat reclaim system may be used in a combined heat and power heat pump (CHPHP) system.

Figure 1:
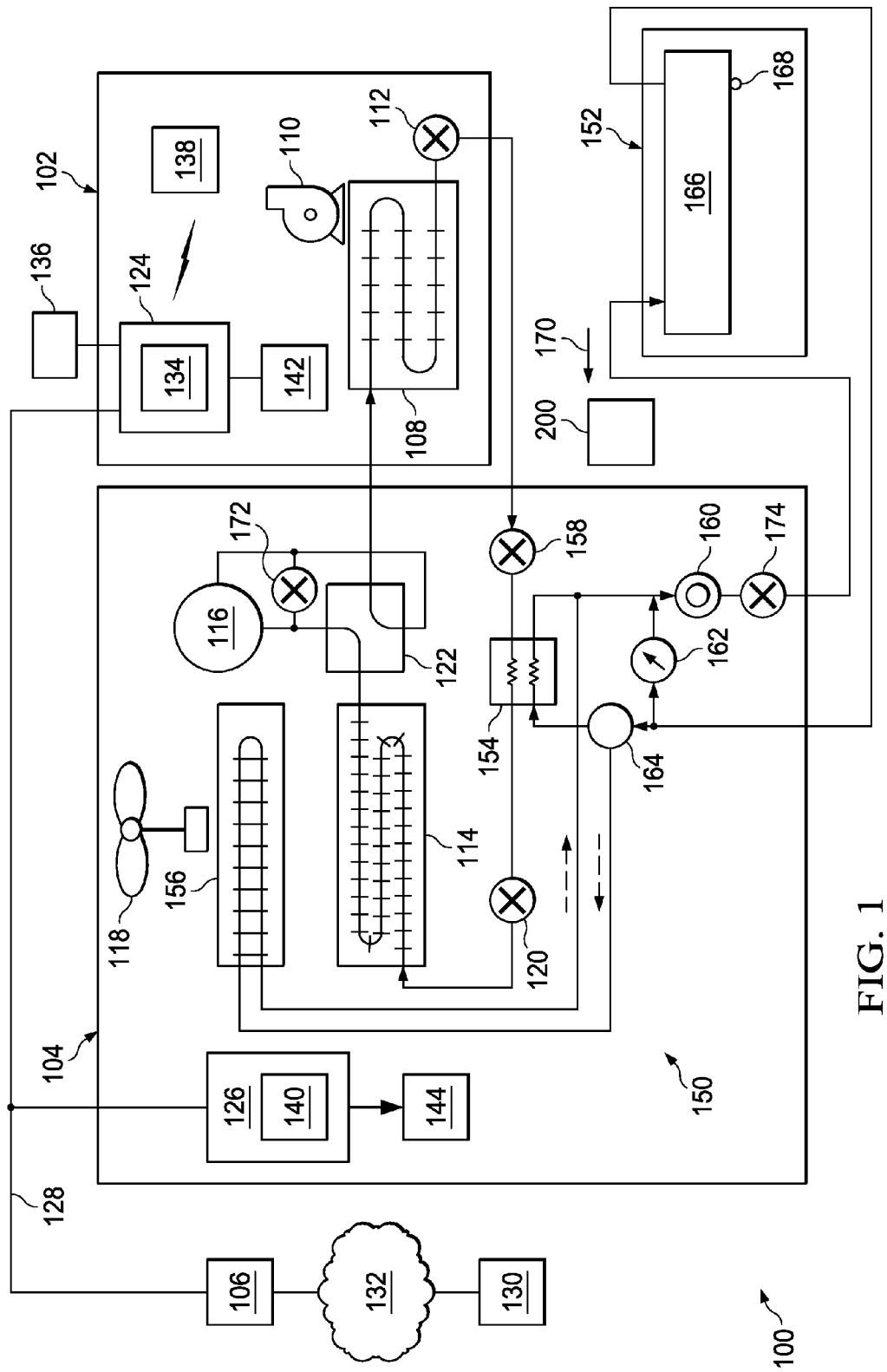
FIG. 1 is a schematic diagram of an HVAC system according to an embodiment of the disclosure.

Referring now to FIG. 1, a simplified schematic diagram of an HVAC system 100 is shown according to an embodiment of the disclosure. HVAC system 100 generally comprises an indoor unit 102, an outdoor unit 104, and a system controller 106. In some embodiments, the HVAC system 100 may also comprise a generator 152 and a generator fluid circuit 150 that is contained within the outdoor unit 104. The system controller 106 may generally control operation of the indoor unit 102 and/or the outdoor unit 104. As shown, the HVAC system 100 is a so-called heat pump system that may be selectively operated to implement one or more substantially closed thermodynamic refrigeration cycles to provide a cooling functionality and/or a heating functionality. In the embodiment shown in FIG. 1, the outdoor unit 104 may also comprise a recovery heat exchanger 154 and a discharge heat exchanger 156. Furthermore, the HVAC system 100 may also comprise a generator 152 and a generator fluid circuit 150 that is configured to connect the generator 152 to the recovery heat exchanger 154 and the discharge heat exchanger 156.

Indoor unit 102 generally comprises an indoor heat exchanger 108, an indoor fan 110, and an indoor metering device 112. Indoor heat exchanger 108 is a plate fin heat exchanger configured to allow heat exchange between refrigerant carried within internal tubing of the indoor heat exchanger 108 and fluids that contact the indoor heat exchanger 108 but that are kept segregated from the refrigerant. In other embodiments, indoor heat exchanger 108 may comprise a spine fin heat exchanger, a microchannel heat exchanger, or any other suitable type of heat exchanger.

The indoor fan 110 is a centrifugal blower comprising a blower housing, a blower impeller at least partially disposed within the blower housing, and a blower motor configured to selectively rotate the blower impeller. In other embodiments, the indoor fan 110 may comprise a mixed-flow fan and/or any other suitable type of fan. The indoor fan 110 is configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, the indoor fan 110 may be a single speed fan.

The indoor metering device 112 is an electronically controlled motor driven electronic expansion valve (EEV). In alternative embodiments, the indoor metering device 112 may comprise a thermostatic expansion valve, a capillary tube assembly, and/or any other suitable metering device. The indoor metering device 112 may comprise and/or be associated with a refrigerant check valve and/or refrigerant bypass for use when a direction of refrigerant flow through the indoor metering device 112 is such that the indoor metering device 112 is not intended to meter or otherwise substantially restrict flow of the refrigerant through the indoor metering device 112.

Outdoor unit 104 generally comprises an outdoor heat exchanger 114, a compressor 116, an outdoor fan 118, an outdoor metering device 120, and a reversing valve 122. Outdoor heat exchanger 114 is a spine fin heat exchanger configured to allow heat exchange between refrigerant carried within internal passages of the outdoor heat exchanger 114 and fluids that contact the outdoor heat exchanger 114 but that are kept segregated from the refrigerant. In other embodiments, outdoor heat exchanger 114 may comprise a plate fin heat exchanger, a microchannel heat exchanger, or any other suitable type of heat exchanger.

The compressor 116 is a multiple speed scroll type compressor configured to selectively pump refrigerant at a plurality of mass flow rates. In alternative embodiments, the compressor 116 may comprise a modulating compressor capable of operation over one or more speed ranges, a reciprocating type compressor, a single speed compressor, and/or any other suitable refrigerant compressor and/or refrigerant pump. In some embodiments, the compressor may comprise a compressor unloading valve 172, which may be an actuated valve, a solenoid-controlled valve, and/or a damper which may be connected in parallel to the compressor 116 and configured to control the pressure across the compressor 116. In some embodiments, the compressor unloading valve 172 may be configured in the refrigerant circuit substantially parallel to the compressor 116 such that when the compressor unloading valve 172 is open, refrigerant may travel directly from a compressor discharge side to a compressor intake side.

The outdoor fan 118 is an axial fan comprising a fan blade assembly and fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 is configured as a modulating and/or variable speed fan capable of being operated at many speeds over one or more ranges of speeds. In other embodiments, the outdoor fan 118 may be configured as a multiple speed fan capable of being operated at a plurality of operating speeds by selectively electrically powering different ones of multiple electromagnetic windings of a motor of the outdoor fan 118. In yet other embodiments, the outdoor fan 118 may be a single speed fan.

The outdoor metering device 120 is a thermostatic expansion valve. In alternative embodiments, the outdoor metering device 120 may comprise an electronically controlled motor driven EEV similar to indoor metering device 112, a capillary tube assembly, and/or any other suitable metering device. The outdoor metering device 120 may comprise and/or be associated with a refrigerant check valve and/or refrigerant bypass for use when a direction of refrigerant flow through the outdoor metering device 120 is such that the outdoor metering device 120 is not intended to meter or otherwise substantially restrict flow of the refrigerant through the outdoor metering device 120.

The reversing valve 122 is a so-called four-way reversing valve. The reversing valve 122 may be selectively controlled to alter a flow path of refrigerant in the HVAC system 100 as described in greater detail below. The reversing valve 122 may comprise an electrical solenoid or other device configured to selectively move a component of the reversing valve 122 between operational positions.

In some embodiments, the outdoor unit 104 may also comprise an additional metering device 158 coupled to the recovery heat exchanger 154 and configured to regulate the flow of refrigerant therethrough. The metering device 158 may comprise a fixed orifice component, for example a capillary tube assembly. In alternative embodiments, the metering device 158 may comprise a thermostatic expansion valve, an electronically controlled motor driven EEV, and/or any other suitable metering device. The metering device 158 may also comprise and/or be associated with a refrigerant check valve and/or refrigerant bypass for use when the direction of refrigerant flow through the metering device 158 is such that the metering device 158 is not intended to meter or otherwise substantially restrict flow of the refrigerant through the outdoor metering device 120. In other embodiments, however, the outdoor unit 104 may not include a metering device 158

Still referring to FIG. 1, the system controller 106 may generally comprise a touchscreen interface for displaying information and for receiving user inputs. The system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, the system controller 106 may not comprise a display and may derive all information from inputs from remote sensors and remote configuration tools. In some embodiments, the system controller 106 may comprise a temperature sensor and may further be configured to control heating and/or cooling of zones associated with the HVAC system 100. In some embodiments, the system controller 106 may be configured as a thermostat for controlling supply of conditioned air to zones associated with the HVAC system 100.

In some embodiments, the system controller 106 may also selectively communicate with an indoor controller 124 of the indoor unit 102, with an outdoor controller 126 of the outdoor unit 104, and/or with other components of the HVAC system 100. In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or any other device 130 via a communication network 132. In some embodiments, the communication network 132 may comprise a telephone network, and the other device 130 may comprise a telephone. In some embodiments, the communication network 132 may comprise the Internet, and the other device 130 may comprise a smartphone and/or other Internet-enabled mobile telecommunication device. In other embodiments, the communication network 132 may also comprise a remote server.

The indoor controller 124 may be carried by the indoor unit 102 and may be configured to receive information inputs, transmit information outputs, and otherwise communicate with the system controller 106, the outdoor controller 126, and/or any other device via the communication bus 128 and/or any other suitable medium of communication. In some embodiments, the indoor controller 124 may be configured to communicate with an indoor personality module 134 that may comprise information related to the identification and/or operation of the indoor unit 102. In some embodiments, the indoor controller 124 may be configured to receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120. In some embodiments, the indoor EEV controller 138 may be configured to receive information regarding temperatures and/or pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112. The indoor EEV controller 138 may also be configured to communicate with the outdoor metering device 120 and/or otherwise affect control over the outdoor metering device 120.

The outdoor controller 126 may be carried by the outdoor unit 104 and may be configured to receive information inputs, transmit information outputs, and otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with a compressor drive controller 144 that is configured to electrically power and/or control the compressor 116.

The HVAC system 100 is shown configured for operating in a so-called heating mode in which heat is absorbed by a refrigerant at the outdoor heat exchanger 114 and heat is rejected by refrigerant at the indoor heat exchanger 108. In some embodiments, the compressor 116 may be operated to compress refrigerant and pump the relatively high temperature and high pressure compressed refrigerant from the compressor 116 to the indoor heat exchanger 108 through the reversing valve 122. From the indoor heat exchanger 108, the refrigerant may be pumped unaffected through the indoor metering device 112 to the outdoor metering device 120 and ultimately to the outdoor heat exchanger 114. The refrigerant may experience a pressure differential across the outdoor metering device 120, be passed through the outdoor heat exchanger 114, and ultimately reenter the compressor 116. As the refrigerant is passed through the outdoor heat exchanger 114, the outdoor fan 118 may be operated to move air into contact with the outdoor heat exchanger 114, thereby transferring heat from the air surrounding the outdoor heat exchanger 114 to the refrigerant. The refrigerant may thereafter re-enter the compressor 116 after passing through a second internal passage within the reversing valve 122.

Alternatively, to operate the HVAC system 100 in a so-called cooling mode, most generally, the roles of the indoor heat exchanger 108 and the outdoor heat exchanger 114 are reversed as compared to their operation in the above-described heating mode. For example, the reversing valve 122 may be controlled to alter the flow path of the refrigerant, the indoor metering device 112 may be enabled, and the outdoor metering device 120 may be disabled and/or bypassed. In cooling mode, heat is absorbed by refrigerant at the indoor heat exchanger 108 and heat is rejected by the refrigerant at the outdoor heat exchanger 114. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108.

Still referring to FIG. 1, the HVAC system 100 also comprises a generator 152 and a generator fluid circuit 150. Generator 152 may comprise a generator heat exchanger 166. The generator 152 may generally be configured to produce and supply electricity and/or rejected heat to provide at least a portion of the energy consumption and/or heat delivery to the indoor unit 102, the outdoor unit 104, and/or any other component of the HVAC system 100. The generator 152 may also comprise an exhaust 170, from which hot exhaust fluid is expelled from the generator 152 as a result of combustion within the generator 152. The exhaust 170 may generally be directed to an exhaust heat reclaim system 200. In some embodiments, the generator 152 may comprise an electricity generating device comprising and/or powered by an internal combustion engine configured to receive and consume a fuel such as natural gas, propane, gasoline, and/or diesel. In other embodiments, the generator 152 may comprise another electricity generating device including, but not limited to, a fuel cell, a generator powered by a micro-turbine, a thermal-photovoltaic system, and/or any other suitable device capable of supplying electrical power and/or heat. In some embodiments, the generator 152 may be a liquid-cooled generator in which the exhaust 170 may comprise about 25% of the rejected heat from the generator 152. In some embodiments, however, the generator 152 may be an air-cooled power generator in which the exhaust 170 may comprise about 75% of the rejected heat from the generator 152. It will be appreciated that a variety of combinations of various fuels and oxidants may also be used. Additional examples of fuels include hydrogen, hydrocarbons, alcohols, and biomass. Examples of oxidants include air, oxygen, chlorine, and chlorine dioxide. A thermal-photovoltaic system may convert solar energy into electricity and/or heat and provide a portion of the power produced to HVAC system 100 without a supply of fuel or oxidizer.

The generator fluid circuit 150 may generally be configured to selectively connect the generator heat exchanger 166 of the generator 152 in fluid communication with the recovery heat exchanger 154 and the discharge heat exchanger 156, both of which are accommodated by and housed within the outdoor unit 104, so that an acceptable heat transfer fluid may selectively flow between the generator heat exchanger 166 and at least one of the recovery heat exchanger 154 and the discharge heat exchanger 156. Heat energy discharged by the generator 152 may therefore generally be carried by the generator fluid circuit 150 from the generator heat exchanger 166 to the recovery heat exchanger 154 and/or the discharge heat exchanger 156. An acceptable heat transfer fluid may comprise water, water and ethylene glycol mixture, brine solution, refrigerant, oil, or any other suitable heat transfer fluid. In some embodiments, the heat transfer fluid may transfer heat, such as rejected heat from the generator 152, to the refrigerant of HVAC system 100 through the recovery heat exchanger 154 and/or the discharge heat exchanger 156.

The generator fluid circuit 150 also comprises a coolant pump 160, a mixing valve 162, and a diverter valve 164, also accommodated by and housed within the outdoor unit 104, and selectively connected in fluid communication through a plurality of fluid conduits. Such fluid conduits may include pipes, tubes, and/or any other suitable conduit which may comprise one or more of a variety of rigid or flexible materials, e.g., polyvinyl chloride (PVC), ductile iron, steel, cast iron, polypropylene, polyethylene, copper, hose with a braided sheath, and/or any other suitable material. The coolant pump 160 may generally be configured to pump the generator heat transfer fluid into inlet tubing associated with the generator heat exchanger 166, through the generator heat exchanger 166, out of the generator heat exchanger 166, through outlet tubing associated with the generator heat exchanger 166, and subsequently to recovery heat exchanger 154 and/or discharge heat exchanger 156 prior to returning the heat transfer fluid to the generator heat exchanger 166. The mixing valve 162 and/or the diverter valve 164 of the generator fluid circuit 150 may be configured to open and close in response to a heating or cooling mode selection by a controller 106, 124, 126 or a difference between a measured heat transfer fluid temperature and a heat transfer fluid temperature set-point. For example, when HVAC system 100 is in the so-called heating mode, diverter valve 164 may direct at least a portion of the heat transfer fluid to recovery heat exchanger 154. In some embodiments, the recovery heat exchanger 154 may be configured to promote heat transfer between the heat transfer fluid and the refrigerant flowing through the recovery heat exchanger 154. Alternatively, the diverter valve 154 may direct heat transfer fluid along a different flow path, such as to discharge heat exchanger 156, during operation of HVAC system 100 in a cooling mode. In some embodiments, the discharge heat exchanger 156 may be configured to promote heat transfer between the heat transfer fluid flowing through the discharge heat exchanger 156 and an airflow pulled through the discharge heat exchanger 156 by outdoor fan 118.

In some embodiments, the generator 152 may also comprise a generator temperature sensor 168 configured to measure the heat transfer fluid temperature within the generator fluid circuit 150 and/or the generator heat exchanger 166, a conduit temperature, and/or an internal temperature of the generator 152. In some embodiments, the generator fluid circuit 150 may comprise one or more thermostats, such as generator circuit thermostat 174, and/or temperature sensors to measure a plurality of temperatures associated with the circulated heat transfer fluid. In some embodiments, if a temperature of the heat transfer fluid associated with the generator heat exchanger 166 drops below a selected temperature set-point, the mixing valve 162 may direct a portion of the heat transfer fluid that has received rejected heat from the generator 152 to circulate within the generator fluid circuit 150 and return to the generator heat exchanger 166 without passing through either the recovery heat exchanger 154 or the discharge heat exchanger 156. Alternatively, in some embodiments, the temperature of the heat transfer fluid returning to the generator 152 may be controlled by the generator circuit thermostat 174 that may generally be configured to remain closed until a predetermined return temperature is achieved, at which time the generator circuit thermostat 174 may modulate the flow of the heat transfer fluid to the generator 152 to control that temperature. Thus, at least a portion of the rejected heat from the generator 152 may be directed back to the generator heat exchanger 166, i.e. to the generator 152, where the returning heat may help maintain a generator 152 operating temperature and/or may receive additional heat to reach a threshold temperature for triggering transfer of the heat to at least one of the recovery heat exchanger 154 and the discharge heat exchanger 156.

The rejected heat from the generator 152 may also be utilized for an HVAC system 100 functionality to increase the efficiency of the HVAC system 100. For example, when the HVAC system 100 is operating in the heating mode, the rejected heat may be directed first to the outdoor unit 104 and then transferred to the indoor unit 102 for heating a space to which the indoor unit 102 supplies air. This benefit may be achieved through the transfer of heat, i.e. heat energy, from the heat transfer fluid in the generator fluid circuit 150 to the refrigerant via the recovery heat exchanger 154. Transferring the rejected heat to the refrigerant may therefore augment the transfer of heat occurring within outdoor heat exchanger 114. The transfer of rejected heat from the generator heat exchanger 166 to the refrigerant may generally be referred to as heat recovery.

The efficiency of the heat-pump based HVAC system 100 operating in a heating mode may, in some embodiments, exceed the efficiency of a system that simply burns natural gas, propane, or other fuels for the purpose of simply distributing the resultant heat of combustion. For example, in some cases, a system configured to combust natural gas may comprise an efficiency of about 80% to about 95% which translates to a coefficient of performance (COP) of about 0.80 to about 0.95, respectively. Comparatively, in determining an efficiency of an HVAC system 100 comprising a heat pump and an electrical power generation source (i.e. generator 152), the efficiency of the electrical power generation source and heat generation efficiency of the generator 152 must be considered as well as the efficiency of the vapor compression cycle efficiency of the heat pump itself. For instance, in some cases, the generator 152 may comprise an electricity generation COP of about 0.25 while also comprising a heat generation COP of about 0.75. This equates to about 25% of electrical energy and about 75% heat energy produced from the fuel combusted in the generator 152. In this example, the vapor compression cycle of the heat pump powered by the generated electricity of the generator 152 may comprise a COP of about 4.0 (i.e. 4 watts of heat produced for every 1 watt of electricity used by the heat pump that is generated by the generator 152). Accordingly, such an HVAC system 100, may comprise an overall system COP of about 1.0 (0.25 generated electricity×4.0 heat produced by heat pump) of electrical energy before any of the heat produced from the generator 152 is reclaimed. In some embodiments, the HVAC system 100 may be able to reclaim about 20-50% of the heat produced by the generator 152 through the recovery heat exchanger 154, thus enabling HVAC system 100 to operate at a COP of about 1.20 to about 1.50 (120% to 150% efficiency). Thus, the COP of a heat pump system, such as HVAC system 100 may operate at much higher efficiencies than the above-described natural gas system alone. Even further, the exhaust heat reclaim system 200 may additionally recover at least about 5-25% of the heat energy discharged by the generator 152.

The heat recovery capability of the HVAC system 100 may replace or reduce the need for the use of an "emergency heat" or "auxiliary heat" source such as electrical resistance heating elements with the heat pump when the heating capacity of a traditional heat pump would be insufficient to meet a heating demand. Additionally, during warmer seasons or environmental conditions, the generator 152 could be used to power the heat pump in cooling mode thereby providing an opportunity to reduce peak electrical demand and avoid high peak electrical rates. The generator 152 may also be configured to operate during electrical grid power outages to provide electricity for heating, cooling, and/or another purpose that requires the generator 152 to supply electrical energy and/or heat energy.

Referring now to FIG. 2A, a schematic drawing of the exhaust heat reclaim system 200 configured in a venting mode is shown according to an embodiment of the disclosure. The exhaust heat reclaim system 200 comprises an exhaust vent tube 204, a diverter valve 206, and an exhaust delivery tube 208. The diverter valve 206 may generally be connected in fluid communication with the exhaust 170 of the generator 152 and configured to receive hot exhaust fluid that may be discharged through the exhaust 170 as a result of fuel combustion within the generator 152. Depending on the configuration of the exhaust heat reclaim system 200 and/or the demands of the HVAC system 100, the diverter valve 206 may be configured to selectively divert the hot exhaust fluid received from the exhaust 170 of the generator 152 at least partially through the exhaust vent tube 204 and the exhaust delivery tube 208.

Generally, when the HVAC system 100 is in a cooling mode, the exhaust heat reclaim system 200 may be configured in the venting mode as shown in FIG. 2, such that performance is not degraded by introducing excess heat into the HVAC system 100. In the venting mode, the diverter valve 206 may be configured to divert substantially all of the hot exhaust fluid received from the generator 152 through the exhaust vent tube 204. The exhaust vent tube 204 may consequently discharge the hot exhaust fluid into the surrounding environment as shown by exhaust airflow 202. Accordingly, when the exhaust heat reclaim system 200 is configured in the venting mode, the exhaust delivery tube 208 may receive substantially none of the hot exhaust fluid. Contrarily, and as will be discussed in more detail further herein, when the HVAC system 100 is in a heating mode, the exhaust heat reclaim system 200 may be configured in a reclaim mode, such that the diverter valve 206 may divert at least a portion of the hot exhaust fluid through the exhaust delivery tube 208. The exhaust delivery tube 208 may generally be configured to direct the hot exhaust fluid onto the outdoor heat exchanger 114. The hot exhaust fluid may generally mix with outdoor air entering the outside heat exchanger 114. Both the hot exhaust fluid and the outdoor air may be pulled over the outdoor heat exchanger 114 by the outdoor fan 118, thus allowing the refrigerant flowing through the outdoor heat exchanger 114 to absorb heat from the hot exhaust fluid.

The exhaust heat reclaim system 200 may generally be operated by controlling the diverter valve 206 in response to the configuration and/or demands of the HVAC system 100. In some embodiments, the diverter valve 206 may be an electronically controlled diverter valve and/or any other suitable electronically controlled damper. In some embodiments, the diverter valve 206 may be may be configured to at least partially open and/or at least partially closed in response to a heating or cooling mode selection by a controller 106, 124, 126. In some embodiments, the diverter valve 206 may be configured to be controlled in response to a measured refrigerant temperature and/or a difference between a measured refrigerant temperature and a refrigerant temperature set threshold. In other embodiments, the diverter valve 206 may be controlled in response to a measured refrigerant temperature entering the outdoor heat exchanger 114 and/or entering the indoor heat exchanger 108. In yet other embodiments, the diverter valve 206 may be controlled in response to an indoor threshold temperature setting and/or comfort level setting programmed by a user.

Referring now to FIG. 2B, a schematic drawing of an exhaust heat reclaim system 200 configured in a heat reclaim mode is shown according to an embodiment of the disclosure. It will be appreciated that the exhaust heat reclaim system 200 is substantially similar to exhaust heat reclaim system 200. Similarly, exhaust heat reclaim system 200 comprises an exhaust vent tube 204, a diverter valve 206, and an exhaust delivery tube 208. However, the exhaust heat reclaim system 200 is shown configured in reclaim mode. The diverter valve 206 may generally be connected in fluid communication to the exhaust 170 of the generator 152 and configured to receive hot exhaust fluid that may be discharged through the exhaust 170 as a result of fuel combustion within the generator 152. Depending on the configuration of the exhaust heat reclaim system 200 and/or the demands of the HVAC system 100, the diverter valve 206 may be configured to selectively divert the hot exhaust fluid received from the exhaust 170 of the generator 152 at least partially through the exhaust vent tube 304 and/or the exhaust delivery tube 208.

Generally, when the HVAC system 100 is in a heating mode, the exhaust heat reclaim system 200 may generally be configured in a reclaim mode as shown in FIG. 2B, such that the diverter valve 206 may divert at least a portion of the hot exhaust fluid through the exhaust delivery tube 208. The exhaust delivery tube 208 may generally be configured to direct the hot exhaust fluid into the outdoor heat exchanger 114 as shown by exhaust airflow 202. The hot exhaust fluid may generally mix with outdoor air entering the outside heat exchanger 114. Both the hot exhaust fluid and the outdoor air may be pulled over the outdoor heat exchanger 114 by the outdoor fan 118. Accordingly, the outdoor heat exchanger 114 may be configured to permit the refrigerant flowing through the outdoor heat exchanger 114 to absorb heat from the hot exhaust fluid passing over the outdoor heat exchanger 114. The outdoor heat exchanger 114 may thus be configured to deliver the heated refrigerant to the indoor unit 102, where the heated refrigerant may be utilized to supply heat to an indoor climate-controlled area.

While the exhaust heat reclaim system 200 may operate in the reclaim mode when the HVAC system 100 is configured in a heating mode, in some embodiments, the exhaust heat reclaim system 200 may alternatively be configured in a partial venting/reclaim mode, so that the diverter valve 206 at least partially diverts a portion of the hot exhaust fluid through the exhaust vent tube 204, while also diverting at least a portion of the hot exhaust fluid through the exhaust delivery tube 208 to the outdoor heat exchanger 114. Venting at least a portion of the hot exhaust gas through the exhaust vent tube 204 in a reclaim mode may require the diverter valve 206 to be configured in a partially open configuration. In some embodiments, diverting at least a portion of the hot exhaust fluid to each of the exhaust vent tube 204 and the exhaust delivery tube 208 may result in less heat reclaimed from the hot exhaust fluid by the outdoor heat exchanger 114. In some embodiments, diverting at least a portion of the hot exhaust fluid to each of the exhaust vent tube 204 and the exhaust delivery tube 208 may be triggered by a sufficient amount of heat being reclaimed by the recovery heat exchanger 154 and/or when a minimal amount of heat may be required by the HVAC system 100. In some embodiments, a partial venting/reclaim mode may also be triggered by a refrigerant temperature threshold, a target indoor area temperature threshold, an outdoor ambient temperature, and/or a heat demand of the HVAC system 100. Alternatively, in other embodiments, even when the HVAC system 100 is configured in a heating mode, the exhaust heat reclaim system 200 may be configured in a venting mode such that substantially none of the hot exhaust fluid is diverted through the exhaust delivery tube 208. Configuring the exhaust heat reclaim system 200 in a venting mode during an HVAC system 100 heating mode may be employed when substantially no additional heat may be required by the HVAC system 100 to heat an indoor space and/or sufficient heat reclaim may be accomplished by the recovery heat exchanger 154.

The exhaust heat reclaim system 200 may generally be configured to be controlled through the operation of the diverter valve 206 in response to the configuration and/or demands of the HVAC system 100. In some embodiments, the diverter valve 206 may be an electronically-controlled diverter valve and/or any other suitable electronically-controlled damper. In some embodiments, the diverter valve 206 may be configured to at least partially open and/or at least partially close in response to a heating or cooling mode selection by a controller 106, 124, 126. In some embodiments, the diverter valve 206 may be configured to be controlled in response to a measured refrigerant temperature and/or a difference between a measured refrigerant temperature and a refrigerant temperature set threshold. In some embodiments, the diverter valve 206 may be controlled in response to a measured refrigerant temperature entering the outdoor heat exchanger 114 and/or entering the indoor heat exchanger 108. In yet other embodiments, the diverter valve 206 may be controlled in response to an indoor threshold temperature setting and/or comfort level setting programmed by a user.

The exhaust heat reclaim system 200 may generally be configured in a reclaim mode to reclaim the heat energy produced by the combustion of fuel within the generator 152 that may otherwise be lost through discharging hot exhaust fluid into the surrounding environment. While the recovery heat exchanger 154 may recover as about 50% (⅔ of the 75% total heat energy) of the heat energy discharged by the generator 152, the exhaust heat reclaim system 200 may generally be configured to reclaim about the last 25% (⅓ of the 75% total heat energy) of the heat energy that is not reclaimed by the recovery heat exchanger 154. In some embodiments, the exhaust heat reclaim system 200 may reclaim at least about 25% of the thermal energy from the hot exhaust fluid discharged by the generator 152 that is not reclaimed by the recovery heat exchanger 154. In other embodiments, the exhaust heat reclaim system 200 may be configured to reclaim at least about 20%, at least about 15%, at least about 10%, and/or at least about 5% of the heat energy from the hot exhaust fluid discharged through the exhaust 170 of the generator 152. Thus, in some embodiments, the exhaust heat reclaim system 200 may increase the overall efficiency of the HVAC system 100 by reclaiming at least about 5-25% of the heat energy discharged by the generator 152 through the exhaust 170. Accordingly, the heat energy reclaimed by heat reclaim system 200, in addition to the heat energy reclaimed through the recovery heat exchanger 154, may enable the HVAC system 100 to operate at a COP of about 1.25 to about 1.75 (125%-175% efficiency).

While in some embodiments, the exhaust reclaim system 200 may be configured to operate in the reclaim mode to reclaim heat energy from the hot exhaust fluid discharged by the generator 152 in order to boost the efficiency of the HVAC system 100, the exhaust heat reclaim system 200 may be configured to operate in the reclaim mode upon a demand for additional heat. The demand for additional heat may be provided by a user input, a temperature sensor associated with the refrigerant, a demand by the HVAC system 100 to meet a particular temperature threshold in an air-conditioned space, and/or any other suitable input or variable requiring the HVAC system 100 to provide additional heat. In some embodiments, the exhaust heat reclaim system 300 may operate in the reclaim mode to simply boost the efficiency of the HVAC system 100 so that it may run at a reduced power consumption level.

Figure 3:
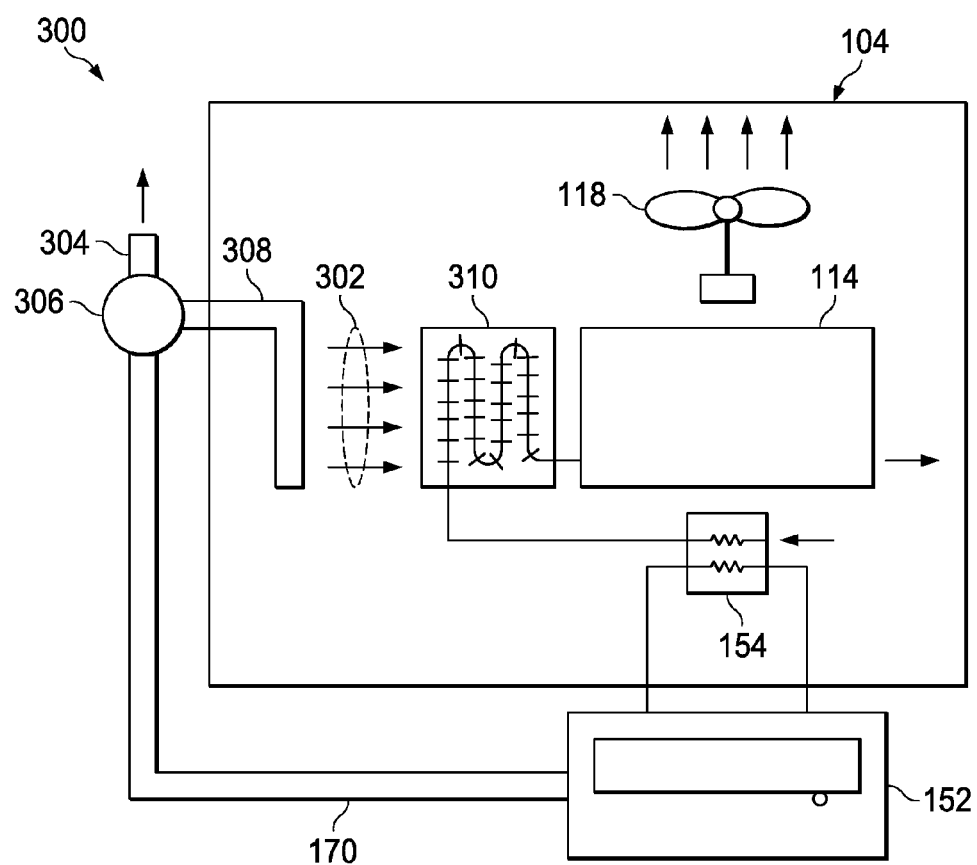
FIG. 3 is a schematic drawing of an exhaust heat reclaim system comprising an auxiliary heat exchanger and configured in a heat reclaim mode according to an embodiment of the disclosure.

Referring now to FIG. 3, a schematic drawing of an exhaust heat reclaim system 300 comprising an auxiliary heat exchanger 310 and configured in a heat reclaim mode is shown according to an embodiment of the disclosure. It will be appreciated that exhaust heat reclaim system 300 is substantially similar to exhaust heat reclaim system 200. Similarly, the exhaust heat reclaim system 300 comprises an exhaust vent tube 304, a diverter valve 306, and an exhaust delivery tube 308. However, the exhaust heat reclaim system 300 also comprises an auxiliary heat exchanger 310. The auxiliary heat exchanger 310 may generally be configured in fluid communication with the recovery heat exchanger 154, such that the auxiliary heat exchanger 310 receives refrigerant exiting the recovery heat exchanger 154. The auxiliary heat exchanger 310 may also be configured in fluid communication with the outdoor heat exchanger 114, such that the auxiliary heat exchanger 310 delivers refrigerant to the outdoor heat exchanger 114.

As previously stated, when the HVAC system 100 is in a heating mode, the exhaust heat reclaim system 300 may generally be configured in a reclaim mode as shown in FIG. 3, such that the diverter valve 306 may divert at least a portion of the hot exhaust fluid through the exhaust delivery tube 308. However, instead of directing the hot exhaust fluid through outdoor heat exchanger 114 as shown in FIG. 3, the diverter valve 306 may direct the hot exhaust fluid onto the auxiliary heat exchanger 310 as shown by exhaust airflow 302. In some embodiments, the auxiliary heat exchanger 310 may be disposed substantially between the exhaust delivery tube 308 and the outdoor heat exchanger 114, such that an exhaust airflow 302 exiting the exhaust delivery tube 308 flows through the auxiliary heat exchanger 310 prior to flowing through the outdoor heat exchanger 114. The hot exhaust fluid exiting the exhaust delivery tube 308 may generally mix with outdoor air entering the auxiliary heat exchanger 310. Both the hot exhaust fluid and the outdoor air may be pulled through the auxiliary heat exchanger 310 and then through the outdoor heat exchanger 114 by the outdoor fan 118. Accordingly, the auxiliary heat exchanger 310 may be configured to permit the refrigerant flowing therethrough to absorb heat from the hot exhaust fluid. In alternative embodiments, the auxiliary heat exchanger 310 may be disposed substantially separate from the outdoor heat exchanger 114, such that the auxiliary heat exchanger 310 is configured to operate as a dedicated heat exchanger configured to permit the refrigerant to absorb heat from the hot exhaust fluid and also disposed such that the hot exhaust fluid and the outdoor air pulled over the auxiliary heat exchanger 310 do not directly flow over the outdoor heat exchanger 114. In such alternative embodiments, the auxiliary heat exchanger 310 may still be configured to deliver the heated refrigerant to the outdoor heat exchanger 114. After heat recovery from the refrigerant via the auxiliary heat exchanger 310 and/or the outdoor heat exchanger 114, the heated refrigerant may be delivered to the indoor unit 102, where the heated refrigerant may be used to supply heat to an indoor climate-controlled area.

Generally, the hot exhaust fluid discharged by the generator 152 through exhaust 170 may comprise carbon dioxide and water, which may form a diluted form of carbonic acid. Carbonic acid may generally be corrosive to metals, and more specifically, corrosive to the outdoor heat exchanger 114 when the hot exhaust fluid containing the carbonic acid comes into contact with the outdoor heat exchanger 114. Furthermore, hot exhaust fluid discharged by the generator 152 through exhaust 170 may comprise sulfur when natural gas is the combustion fuel used in the generator 152. The sulfur may combine with water in the hot exhaust fluid to produce sulfuric acid, which may also be corrosive to the outdoor heat exchanger 114 when the hot exhaust fluid containing the sulfuric acid contacts the outdoor heat exchanger 114. Accordingly, the auxiliary heat exchanger 310 may be employed to receive the discharged hot exhaust fluid to prevent any carbonic acid and/or sulfuric acid from contacting the outdoor heat exchanger 114. In some embodiments, the auxiliary heat exchanger 310 may thus act as a barrier to corrosive hot exhaust fluids, which may prolong the life of and/or prevent corrosion from forming on the outdoor heat exchanger 114. In some embodiments, the auxiliary heat exchanger 310 may comprise a corrosion resistant coating. In some embodiments, the auxiliary heat exchanger 310 may be formed from a corrosion resistant material, such as, but not limited to, stainless steel. In some embodiments, however, the auxiliary heat exchanger 310 may be formed from a corrosion resistant alloy containing at least one of chromium, manganese, and nickel.

While the exhaust heat reclaim system 300 may operate in the reclaim mode when the HVAC system 100 is configured in a heating mode, in some embodiments, the exhaust heat reclaim system 300 may be configured in a partial venting/reclaim mode, so that the diverter valve 306 at least partially diverts a portion of the hot exhaust fluid through the exhaust vent tube 304, while also diverting at least a portion of the hot exhaust fluid through the exhaust delivery tube 308 to the auxiliary heat exchanger 310. Venting at least a portion of the hot exhaust gas through the exhaust vent tube 304 in a reclaim mode may require the diverter valve 306 to be configured in a partially open configuration. In some embodiments, diverting at least a portion of the hot exhaust fluid to each of the exhaust vent tube 304 and the exhaust delivery tube 308 may result in less heat reclaimed from the hot exhaust fluid by the auxiliary heat exchanger 310 and/or the outdoor heat exchanger 114. In some embodiments, diverting at least a portion of the hot exhaust fluid to each of the exhaust vent tube 304 and the exhaust delivery tube 308 may be triggered by a sufficient amount of heat being reclaimed by the recovery heat exchanger 154 and/or when a minimal amount of heat may be required by the HVAC system 100. In some embodiments, a partial venting/reclaim mode may also be triggered by a refrigerant temperature threshold, a target indoor area temperature threshold, an outdoor ambient temperature, and/or a heat demand of the HVAC system 100. Alternatively, in other embodiments, even when the HVAC system 100 is configured in a heating mode, the exhaust heat reclaim system 300 may be configured in a venting mode such that substantially none of the hot exhaust fluid is diverted through the exhaust delivery tube 308. Configuring the exhaust heat reclaim system 300 in a venting mode during an HVAC system 100 heating mode may be employed when substantially no additional heat may be required by the HVAC system 100 to heat an indoor space and/or sufficient heat reclaim may be accomplished by the recovery heat exchanger 154.

The exhaust heat reclaim system 300 may generally be configured to be controlled through the operation of the diverter valve 306 in response to the configuration and/or demands of the HVAC system 100. In some embodiments, the diverter valve 306 may be an electronically-controlled diverter valve and/or any other suitable electronically-controlled damper. In some embodiments, the diverter valve 306 may be configured to at least partially open and/or at least partially close in response to a heating or cooling mode selection by a controller 106, 124, 126. In some embodiments, the diverter valve 306 may be configured to be controlled in response to a measured refrigerant temperature and/or a difference between a measured refrigerant temperature and a refrigerant temperature set threshold. In some embodiments, the diverter valve 306 may be controlled in response to a measured refrigerant temperature entering the auxiliary heat exchanger 310, the outdoor heat exchanger 114, and/or entering the indoor heat exchanger 108. In yet other embodiments, the diverter valve 306 may be controlled in response to an indoor threshold temperature setting and/or comfort level setting programmed by a user.

The exhaust heat reclaim system 300 may generally be configured in a reclaim mode to reclaim the heat energy produced by the generator 152 that would otherwise be lost through hot exhaust fluid discharged into the surrounding environment. In some embodiments, the exhaust heat reclaim system 300 may be configured such that heat from the hot exhaust fluid may be recovered by the auxiliary heat exchanger 310 alone. In other embodiments, the exhaust heat reclaim system 400 may rely on the auxiliary heat exchanger 310 and/or the outdoor heat exchanger 114 to reclaim heat from the hot exhaust fluid. While the recovery heat exchanger 154 may recover as about 50% (⅔ of the 75% total heat energy) of the heat energy discharged by the generator 152, the exhaust heat reclaim system 300 may generally be configured to reclaim about the last 25% (⅓ of the 75% total heat energy) of the heat energy that is not reclaimed by the recovery heat exchanger 154. In some embodiments, the exhaust heat reclaim system 300 may reclaim at least about 25% of the thermal energy from the hot exhaust fluid discharged by the generator 152 that is not reclaimed by the recovery heat exchanger 154. In other embodiments, the exhaust heat reclaim system 300 may be configured to reclaim at least about 20%, at least about 15%, at least about 10%, and/or at least about 5% of the heat energy from the hot exhaust fluid discharged through the exhaust 170 of the generator 152. Thus, in some embodiments, the exhaust heat reclaim system 300 may increase the overall efficiency of the HVAC system 100 by reclaiming at least about 5-25% of the heat energy discharged by the generator 152 through the exhaust 170. Accordingly, the heat energy reclaimed by heat reclaim system 400, in addition to the heat energy reclaimed through the recovery heat exchanger 154, may enable the HVAC system 100 to operate at a COP of about 1.25 to about 1.75 (125%-175% efficiency).

While in some embodiments, the exhaust heat reclaim system 300 may be configured to operate in the reclaim mode to reclaim heat energy from the hot exhaust fluid discharged by the generator 152 in order to boost the efficiency of the HVAC system 100, the exhaust heat reclaim system 300 may be configured to selectively operate in the reclaim mode upon a demand for additional heat. The demand for additional heat may be provided by a user input, a temperature sensor associated with the refrigerant, a demand by the HVAC system 100 to meet a particular temperature threshold in an air-conditioned space, and/or any other suitable input or variable requiring the HVAC system 100 to provide additional heat. In some embodiments, the exhaust heat reclaim system 300 may operate in the reclaim mode to simply boost the efficiency of the HVAC system 100 so that it may run at a reduced power consumption level.

Figure 4:
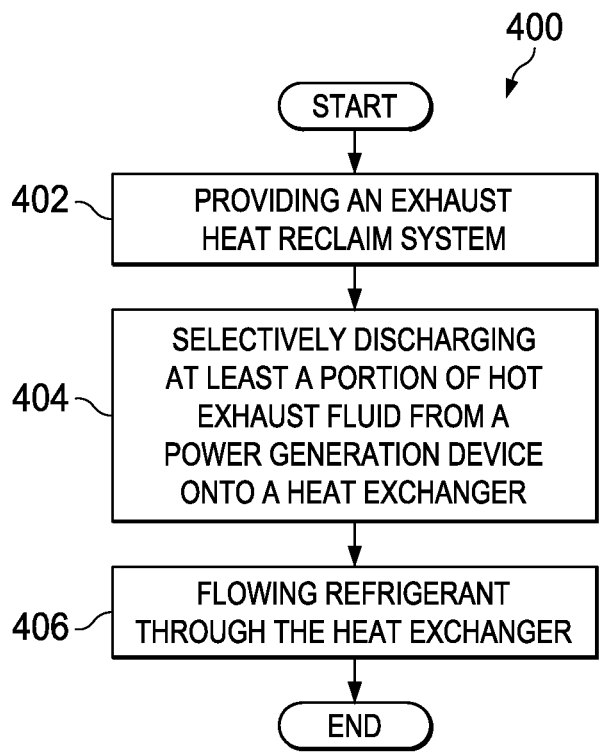
FIG. 4 is a flowchart of a method of reclaiming exhaust heat in an HVAC system according to an embodiment of the disclosure.

Referring now to FIG. 4, a flowchart of a method 400 of reclaiming exhaust heat in an HVAC system 100 is shown according to an embodiment of the disclosure. The method 400 may begin at block 402 by providing an exhaust heat reclaim system. The method 400 may continue at block 404 by selectively discharging a hot exhaust fluid from a power generation device onto a heat exchanger. In some embodiments, the hot exhaust fluid may be the product of a combustion fuel burned by a generator. The method 400 may conclude at block 406 by flowing a refrigerant through the heat exchanger. In some embodiments, the refrigerant may absorb heat energy carried by the hot exhaust fluid and may be delivered to an indoor unit.

Figure 5:
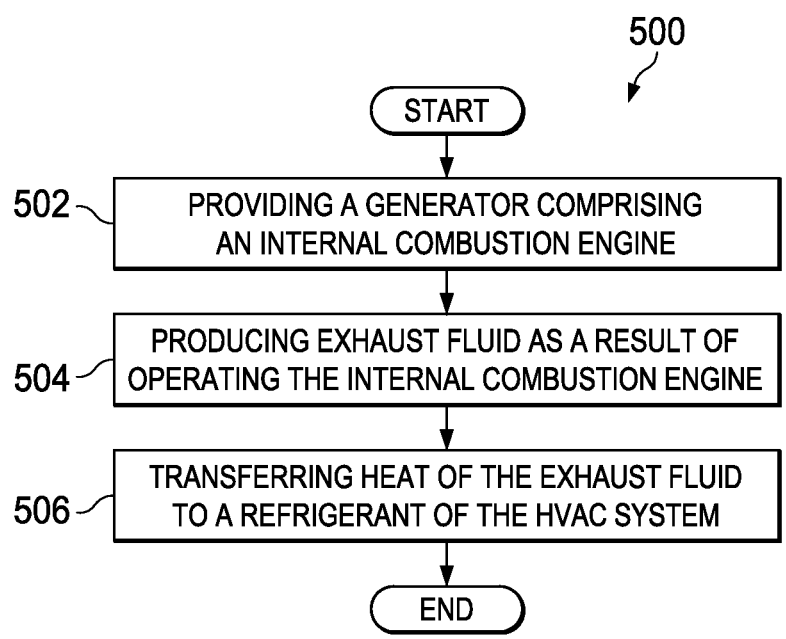
FIG. 5 is a flowchart of a method of operating an HVAC system according to an embodiment of the disclosure.

Referring now to FIG. 5, a flowchart of a method 500 of operating a heating, ventilation, and/or air conditioning (HVAC) system 100 is shown according to an embodiment of the disclosure. The method may begin at block 502 by providing a generator 152 comprising an internal combustion engine. The method 500 may continue at block 504 by producing exhaust fluid as a result of operating the internal combustion engine. The method 500 may conclude at block 506 by transferring heat of the exhaust fluid to a refrigerant of the HVAC system 100.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A heating, ventilation, and/or air conditioning (HVAC) system, comprising:
   a generator comprising an internal combustion engine, the generator being configured to provide exhaust fluid to an exhaust of the generator;
   a heat exchanger configured to receive a refrigerant; and
   an exhaust delivery tube connected to the exhaust and configured to deliver received exhaust fluid into contact with the heat exchanger.

2. The HVAC system of claim 1, wherein the heat exchanger is configured to promote heat transfer from the exhaust fluid to refrigerant flowing through the heat exchanger.

3. The HVAC system of claim 1, further comprising:
   a diverter configured to selectively divert at least a portion of the exhaust fluid through the exhaust delivery tube.

4. The HVAC system of claim 3, wherein the diverter is selectively controlled by at least one controller.

5. The HVAC system of claim 1, wherein the heat exchanger is an auxiliary heat exchanger.

6. The HVAC system of claim 5, wherein the auxiliary heat exchanger is at least one of (1) formed from a corrosion-resistant material and (2) coated with a corrosion-resistant coating.

7. The HVAC system of claim 1, wherein at least about 15% of the heat carried by the exhaust fluid is transferred to the refrigerant.

8. The HVAC system of claim 1, wherein at least about 20% of the heat carried by the exhaust fluid is transferred to the refrigerant.

9. The HVAC system of claim 1, wherein at least about 25% of the heat carried by the exhaust fluid is transferred to the refrigerant.

10. A method of operating a heating, ventilation, and/or air conditioning (HVAC) system, comprising:
    providing a generator comprising an internal combustion engine and an exhaust delivery tube connected to an exhaust of the internal combustion engine;
    producing exhaust fluid as a result of operating the internal combustion engine;
    passing the exhaust fluid through the exhaust delivery tube;
    selectively directing at least a portion of the exhaust fluid from the exhaust delivery tube into contact with a heat exchanger of the HVAC system; and
    transferring heat from the exhaust fluid to a refrigerant flowing through the heat exchanger of the HVAC system.

11. The method of claim 10, wherein at least a portion of the exhaust fluid is discharged from the exhaust delivery tube and into contact with the heat exchanger.

12. The method of claim 11, wherein the heat exchanger is configured to promote heat transfer between the exhaust fluid and the refrigerant.

13. The method of claim 12, wherein the heat exchanger is an auxiliary heat exchanger connected in fluid communication with an outdoor heat exchanger of an outdoor unit of the HVAC system.

14. The method of claim 13, wherein the auxiliary heat exchanger is at least one of (1) formed from a corrosion-resistant material and (2) coated with a corrosion-resistant coating.

15. The method of claim 10, wherein at least about 15% of the heat carried by the exhaust fluid is transferred to the refrigerant.

16. The method of claim 10, wherein at least about 20% of the heat carried by the exhaust fluid is transferred to the refrigerant.

17. The method of claim 10, wherein at least about 25% of the heat carried by the exhaust fluid is transferred to the refrigerant.

18. The method of claim 1, wherein the heat exchanger is an outdoor heat exchanger disposed in an outdoor unit of the HVAC system.

19. The method of claim 12, wherein the heat exchanger is an outdoor heat exchanger disposed in an outdoor unit of the HVAC system.

* * * * *